United States Patent
Kang et al.

(10) Patent No.: US 7,443,542 B2
(45) Date of Patent: Oct. 28, 2008

(54) METHOD AND APPARATUS FOR DETERMINING ERROR DIFFUSION COEFFICIENTS

(75) Inventors: Ki-min Kang, Seongnam-si (KR); Goo-soo Gahang, Yongin-si (KR); Choon-woo Kim, Seoul (KR); Hyeon-seok Seo, Incheon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 911 days.

(21) Appl. No.: 10/873,506

(22) Filed: Jun. 23, 2004

(65) Prior Publication Data

US 2005/0007635 A1    Jan. 13, 2005

(30) Foreign Application Priority Data

Jul. 9, 2003    (KR) ...................... 10-2003-0046321

(51) Int. Cl.
*G06K 15/00* (2006.01)
*H04N 1/40* (2006.01)
*H04N 1/405* (2006.01)

(52) U.S. Cl. ...................... 358/3.03; 358/3.05; 358/3.06

(58) Field of Classification Search ................. 358/3.01, 358/3.03, 3.04, 3.05, 3.06; 382/162, 252, 382/254, 270
See application file for complete search history.

(56) References Cited

U.S. PATENT DOCUMENTS

| | | | |
|---|---|---|---|
| 5,696,846 A | 12/1997 | Shimazaki | 382/254 |
| 5,822,451 A * | 10/1998 | Spaulding et al. | 382/162 |
| 5,905,816 A | 5/1999 | Shimazaki | 382/254 |
| 6,563,957 B1 * | 5/2003 | Li et al. | 382/252 |
| 2002/0181023 A1 | 12/2002 | Gorian et al. | 358/3.04 |
| 2003/0081257 A1 * | 5/2003 | Toyoda et al. | 358/3.13 |

FOREIGN PATENT DOCUMENTS

| | | |
|---|---|---|
| JP | 08-228288 | 9/1996 |
| JP | 08-279906 | 10/1996 |
| JP | 2000-341520 | 12/2000 |
| JP | 2002-094790 | 3/2002 |

* cited by examiner

*Primary Examiner*—Edward L Coles
*Assistant Examiner*—James A Thompson
(74) *Attorney, Agent, or Firm*—Roylance, Abrams, Berdo & Goodman, L.L.P.

(57) ABSTRACT

Provided are a method and apparatus for determining error diffusion coefficients. The method includes: (a) setting N groups of error diffusion coefficients (N is a positive integer), in which each group includes a plurality of coefficients; (b) binarizing an image having one gray level value using each of the N groups of error diffusion coefficients; (c) detecting N fit values with respect to N binary-coded images using an evaluation function; (d) determining whether the fit values are detected a predetermined number of times; (e) when a detection number of the fit values does not coincide with the predetermined number of times, reproducing the N groups of error diffusion coefficients according to reproduction rates determined by the N fit values; (f) selecting optional error diffusion coefficients in the reproduced N groups of error diffusion coefficients, and substituting portions of data of selected error diffusion coefficients with each other; and (g) determining the N groups of error diffusion coefficients including the error diffusion coefficients containing substituted data as new error diffusion coefficients, and returning to step (b).

11 Claims, 8 Drawing Sheets

(a)

| $P_1$ | $E_1$ |
|---|---|
| $E_2$ | |

(b)

| | $P_1$ | $E_1$ |
|---|---|---|
| $E_2$ | $E_3$ | |

|   | $E_1$ | $E_2$ |
|---|---|---|
| 1 | 10001011 | 01011011 |
| 2 | 10110111 | 11011110 |
| ⋮ | ... | |
| N | 00011110 | 00101110 |

|   | $E_1$ | $E_2$ |
|---|---|---|
| 1 | 139 | 91 |
| 2 | 183 | 222 |
| ⋮ | ... | |
| N | 30 | 46 |

(a)

(b)

(a)

(b)

(a)

(b)

METHOD AND APPARATUS FOR DETERMINING ERROR DIFFUSION COEFFICIENTS

PRIORITY

This application claims the benefit under 35 U.S.C. §119 (a) of Korean Patent Application No. 2003-46321, filed on Jul. 9, 2003, in the Korean Intellectual Property Office, the entire disclosure of which is incorporated herein by reference.

BACKGROUND OF THE INVENTION

1. Field of the Invention

The present invention relates to error diffusion coefficients used in a printer which prints an image after binary coding the image. More particularly, the present invention relates to a method and an apparatus for determining optimal error diffusion coefficients.

2. Description of the Related Art

In general, an image having 256 brightness levels between 0 (black) and 255 (white) is referred to as a continual gray level image. A printer can reproduce only two gray levels by either printing a dot or not printing a dot on a printing medium. Therefore, in order to print an image having 256 gray levels based on a monitor using a printer, a unit for converting the image into binary codes is needed. A halftone method is a method of representing a continual gray level image with 0 and 255, and a binary image is an image generated by the halftone method.

An error diffusion method is widely used as the halftone method. In error diffusion methods, an input gray level image is converted into binary code values using a threshold value and errors generated by binarization are diffused into neighboring pixels. Such error diffusion methods include the Floyd-Steinberg method, which uses a fixed error diffusion coefficient, and a method that uses an error diffusion coefficient that varies with input gray value.

The Floyd-Steinberg method includes adding a gray value of an input pixel to an error caused by an error diffusion coefficient propagated using an error coefficient from neighboring pixels, converting the sum of the input grey value and the error (hereinafter referred to as "combined value") into a binary code using a threshold value, and finally transmitting the error to neighboring pixels through an error diffusion filter having the error diffusion coefficient. In the Floyd-Steinberg method, the combined value is compared with the threshold value, a binary image of gray level 255 is output when the combined value is larger than the threshold value, and a binary image of gray level 0 is output when the combined value is smaller than the threshold value. After outputting the binary image, an error between the gray level (0 or 255) of the binary image and the combined value is calculated, and the error is transmitted to peripheral areas, which are not changed into binary.

The method that uses a changing error diffusion coefficient includes selecting an error diffusion filter from a look-up table, adding the input gray level value to the error transmitted from neighboring pixels, converting the sum of the input grey value and the error (hereinafter referred to as a "combined value") into a binary value using a threshold value, and transmitting the error to neighboring pixels through the error diffusion filter. In this method, a binary image is output by comparing the combined value with the threshold value, and the error between the gray level value of the output binary image and the combined value is calculated and transmitted to peripheral portions through the error diffusion filter.

However, when an image is binarized using a fixed error diffusion coefficient, a worm artifact is generated, and the image quality is lowered since minor pixels are not distributed evenly. Also, when an image is binarized using a changing error diffusion coefficient, the error diffusion coefficient is determined through trial and error operations, and thus, an effective error diffusion coefficient cannot be determined in a short time period.

SUMMARY OF THE INVENTION

The present invention provides a method of determining optimal error diffusion coefficients using a genetic algorithm.

The present invention also provides an apparatus for determining optimal error diffusion coefficients, which performs the above error diffusion coefficient determining method.

According to an aspect of the present invention, there is provided a method of determining error diffusion coefficients, which is used in a printer that binarizes and prints an image. The method includes setting N groups of error diffusion coefficients (N is a positive integer), in which each group includes a plurality of coefficients; binarizing an image having one gray level value using each of the N groups of error diffusion coefficients; detecting N fit values with respect to N binary-coded images using an evaluation function; determining whether the fit values are detected a predetermined number of times; when a detection number of the fit values does not coincide with the predetermined number of times, reproducing the N groups of error diffusion coefficients according to reproduction rates determined by the N fit values; selecting optional error diffusion coefficients in the reproduced N groups of error diffusion coefficients, and switching portions of data of selected error diffusion coefficients with each other; and determining the N groups of error diffusion coefficients including the error diffusion coefficients containing switched data as new error diffusion coefficients, and returning to the binarizing step.

According to another aspect of the present invention, there is provided an apparatus for determining error diffusion coefficients, which is used in a printer that binarizes and prints an image. The apparatus includes a coefficient setting unit that sets N groups of error diffusion coefficients (N is a positive integer), each group including a plurality of coefficients; an image binarizing unit that binarizes an image having one gray level value using each of the N groups of error diffusion coefficients; a fit value detector that detects N fit values with respect to each of the N binary-coded images using an evaluation function; a detection number checking unit that checks whether the fit values are detected for a predetermined number of times; a coefficient reproducing unit that reproduces the N groups of error diffusion coefficients according to reproduction rates determined by the detected N fit values; a coefficient switching unit that selects optional error diffusion coefficients in the reproduced N groups of error diffusion coefficients, and switches portions of data of selected error diffusion coefficients; and a coefficient determining unit that determines the N groups of error diffusion coefficients including the substituted error diffusion coefficients as new error diffusion coefficients, and outputs the result of the determination to the image binarizing unit.

BRIEF DESCRIPTION OF THE DRAWINGS

The above and other features and advantages of the present invention will become more apparent by describing in detail exemplary embodiments thereof with reference to the attached drawings in which.

Throughout the drawings, it should be appreciated that like reference numbers are used to depict like features and structures.

DETAILED DESCRIPTION OF THE INVENTION

A method of determining error diffusion coefficients according to certain exemplary embodiments of the present invention will now be described with reference to the accompanying drawings.

Figure 1:
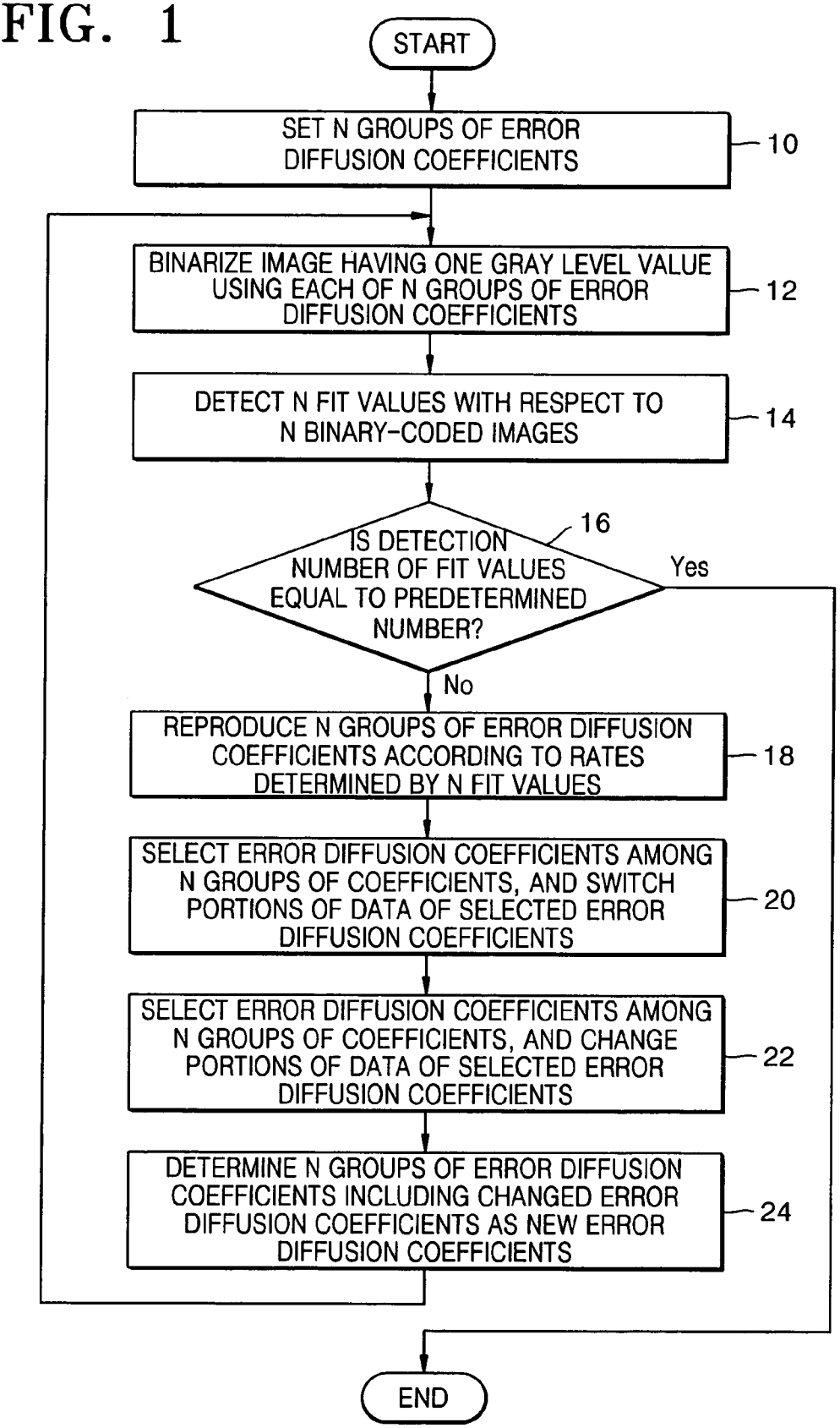
FIG. 1 is a flowchart illustrating a method of determining error diffusion coefficients according to an embodiment of the present invention.

FIG. 1 is a flowchart illustrating a method of determining error diffusion coefficients according to an embodiment of the present invention. The method includes reproducing, substituting, and changing error diffusion coefficients of a group N (steps 10 through 24).

Figures 2, 3:
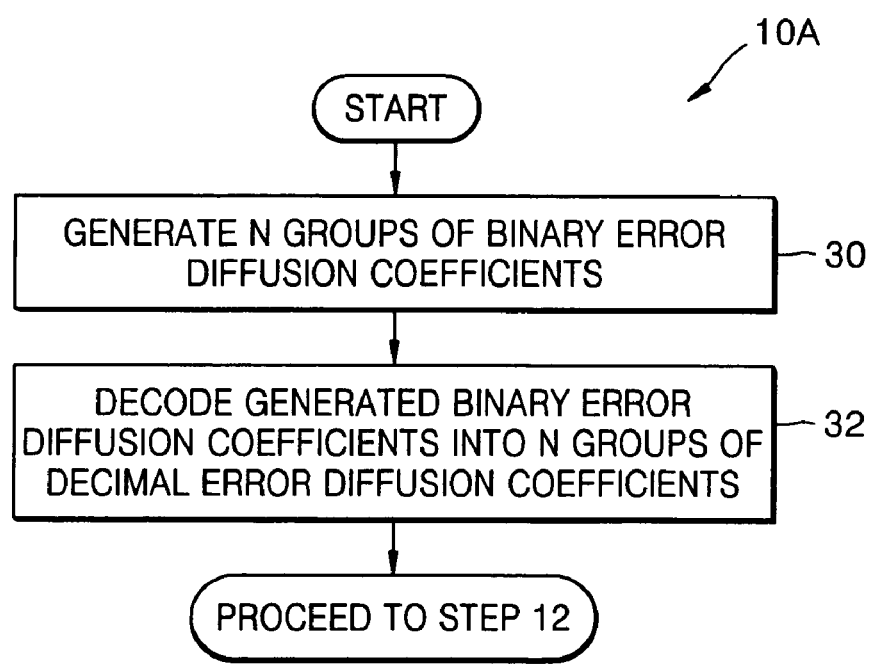
FIG. 2 illustrates an example of error diffusion coefficients diffused in a predetermined pixel.
FIG. 3 is a flowchart illustrating Step 10 of the method of FIG. 1 according to an embodiment of the present invention.

A positive integer number of N groups of error diffusion coefficients are set, each group containing a plurality of coefficients (step 10). FIG. 2 shows two examples of error diffusion coefficients diffused in a predetermined pixel. FIG. 2(a) shows two error diffusion coefficients (E1 and E2) diffused on a predetermined pixel P1, and FIG. 2(b) shows three error diffusion coefficients (E1, E2, and E3) diffused in the predetermined pixel P1. As shown in FIG. 2, two, three, or more error diffusion coefficients form one group. N groups of error diffusion coefficients are set. It is desirable that a large number of groups are set, such as a number on the order of hundreds of groups.

FIG. 3 is a flowchart illustrating an example 10A of step 10 shown in FIG. 1. Step 10A includes decoding the binary error diffusion coefficients into decimal error diffusion coefficients (steps 30 and 32).

Figures 4, 5, 6:
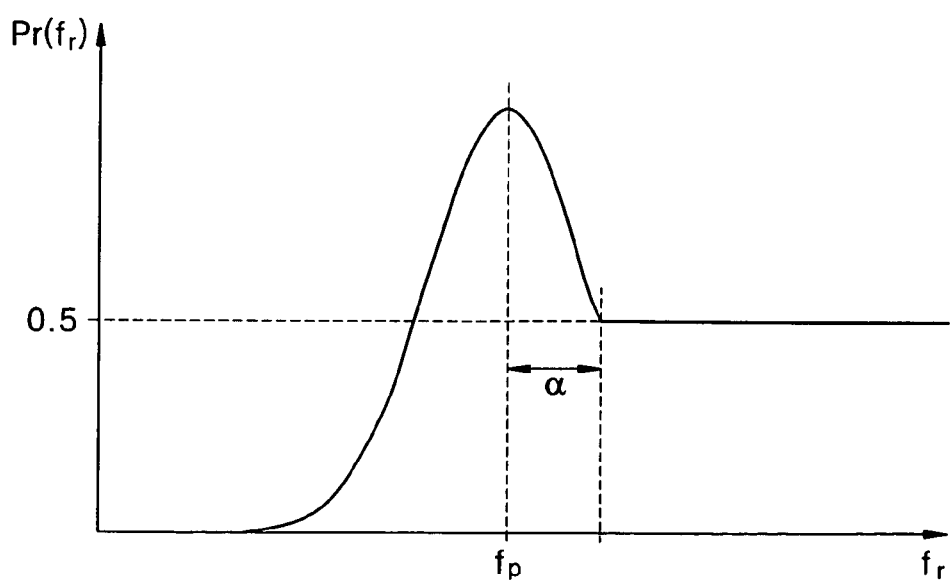
FIG. 4 illustrates examples of N groups of binary error diffusion coefficients.
FIG. 5 illustrates an example in which binary error diffusion coefficients are decoded into decimal-form error diffusion coefficients.
FIG. 6 illustrates an optimal energy spectrum having an ideal blue noise characteristic.

First, N groups of binary error diffusion coefficients are generated (step 30). FIG. 4 shows an example of N groups of binary error diffusion coefficients in which each group includes two error diffusion coefficients generated at an initial stage. In alternative embodiments, each group may include three or more error diffusion coefficients.

After step 30, the N groups of error diffusion coefficients are decoded into decimal error diffusion coefficients (step 32). FIG. 5 shows an example of decoding the N groups of binary error diffusion coefficients shown in FIG. 4 into N groups of decimal error diffusion coefficients.

After step 10, an image having a single gray level value is binary coded using each of the N groups of error diffusion coefficients (step 12). The single grey level image is an image of predetermined size formed by one predetermined gray level value from 0 through 255. Since there are N groups of error diffusion coefficients, the image is binary coded N times. Therefore, N binary-coded images are output. The binary coding is performed by adding the gray level value of the image to errors obtained from the error diffusion coefficients, and comparing the resulting values to a threshold value. Meanwhile, after performing a step 24, which will be described later, the single grey level image is binary coded using N newly determined groups of error diffusion coefficients.

After step 12, N fit values are determined using an evaluation function for each of the N binary-coded images (step 14). The evaluation function means a correlation coefficient between an optimal energy spectrum having an ideal blue noise characteristic and energy spectrums of the N binary-coded images.

FIG. 6 shows an optimal energy spectrum having an ideal blue noise characteristic. The following Equation (1) is a Gaussian function for obtaining the optimal energy spectrum:

$$\Pr(f_r) = \exp\left(\frac{-(f_r - f_p)^2}{2\alpha^2}\right) \quad f_r \le (f_p + \alpha) \quad (1)$$
$$\Pr(f_r) = 0.5 \quad f_r > (f_p + \alpha), \alpha = (f_p/10)$$

Here, $\Pr(f_r)$ denotes energy.

Blue noise is noise with a frequency distribution corresponding to a high-pass filter having a high response at a certain frequency defined as a principal frequency. An ideal principal frequency fp is defined by Equation 2 below with respect to an image of a predetermined size that has a single grey level value x:

$$f_p = \begin{cases} \sqrt{1 - x/255} & x \geq 128 \\ \sqrt{x/255} & x < 128 \end{cases} \quad (2)$$

That is, when the frequency distribution of the binary-coded image that has the one gray level value x displays a high-pass filter-type frequency distribution having a large response at the principal frequency $f_p$, the image exhibits the ideal blue noise characteristic.

Equation 3 is an evaluation function defined by the above blue noise characteristic:

$$R = \frac{\sum_m (A_m - \overline{A})(B_m - \overline{B})}{\sqrt{\left(\sum_m (A_m - \overline{A})^2\right)\left(\sum_m (B_m - \overline{B})^2\right)}} \quad (3)$$

Here, R represents the evaluation function, $\overline{A}$ represents an average energy in the optimal energy spectrum, $A_m$ represents energy at each frequency in the optimal energy spectrum. $\overline{B}$ represents an average energy in a predetermined comparison energy spectrum, and $B_m$ represents energy at each frequency in the predetermined comparison energy spectrum.

The evaluation function, which ranges from −1 to 1, is determined by comparing the comparison energy spectrum of each of N images to the optimal energy spectrum, and thus N evaluation functions can be obtained for the N images.

The fit values are determined by adding together an evaluation function in a low frequency region and an evaluation function in a high frequency region. The following Equation 4 is used to calculate the fit values:

$$F_k = R_{k1} + R_{k2} \quad (4)$$

Here, $F_k$ represents the fit value, $R_{k1}$ represents the evaluation function when $f_r \leq (f_p + \alpha)$, and $R_{k2}$ represents the evaluation function when $f_r > (f_p + \alpha)$. Equation 4 is the sum of evaluation functions for low and high frequency regions after dividing one energy spectrum into the low and high frequency regions.

Since the evaluation function ranges from −1 through 1, the fit value of Equation 4 has a range of −2 through 2. The greater the fit value, the more similar the comparison energy spectrum to the optimal energy spectrum. That is, when the fit value is close to 2, the image quality of the binary-coded image is good. N fit values of the N binary-coded images are determined using Equation 4.

After step 14, it is determined that the detected number of the fit values is the predetermined value (step 16). For example, if the predetermined value is 200, it is determined that the detected number of the fit values is 200 so that reproducing, substituting, and changing operations, which will be described later, are repeated hundreds of times. If the predetermined number of fit values are all determined, the determination process is suspended.

After step 16, if it is determined that the N fit values are not detected the predetermined times, the N groups of error diffusion coefficients are reproduced according to a reproduction rate that is determined by the N fit values (step 18). If it is assumed that the sum of the rates of detecting each of N fit values is 1, the rate of detecting each fit value can be obtained using Equation 5:

$$P_k = \frac{F_k}{\sum_{i=1}^{N} F_i} \quad (5)$$

Here, $P_k$ represents the reproduction rate with respect to a $k^{th}$ fit value $F_k$.

According to Equation 5, a rate of a predetermined fit value can be calculated from the sum of N fit values, and thus the reproduction rate of the predetermined fit value can be determined.

The N groups of error diffusion coefficients are reproduced according to the reproduction rates of the fit values calculated using Equation 5. Since the quality of the binary-coded image is good when the fit value is large, as many as possible error diffusion coefficients for binary-coded images having large fit values are reproduced. Therefore, the N groups of error diffusion coefficients are reorganized as N new groups of error diffusion coefficients, by which the quality of the binary-coded image can be improved.

Figure 7:
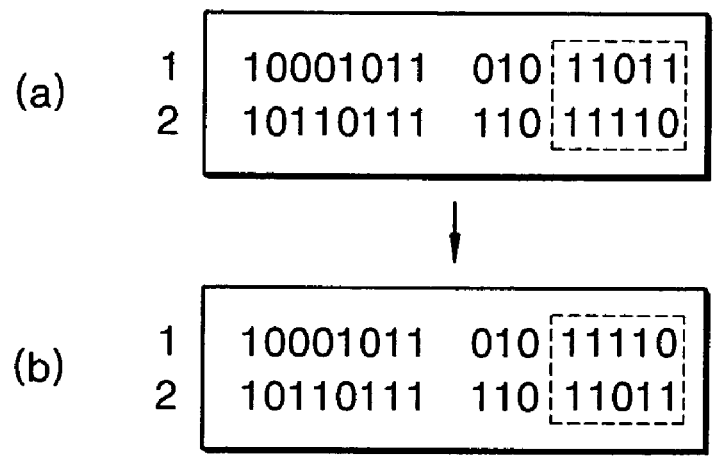
FIG. 7 illustrates an example in which portions of the data of selected error diffusion coefficients of two different groups are switched with each other.

After step 18, some error diffusion coefficients are selected from among the reproduced N groups of error diffusion coefficients, and some portions of the data of the selected error diffusion coefficients are switched with portions of error diffusion coefficients of another group (step 20). FIG. 7 illustrates an example of switching part of the data of two error diffusion coefficients. Within the hatched box, binary data of first and second error diffusion coefficients are switched. In alternative embodiments, such data switching can be performed between error diffusion coefficients of three or more groups.

Figure 8:
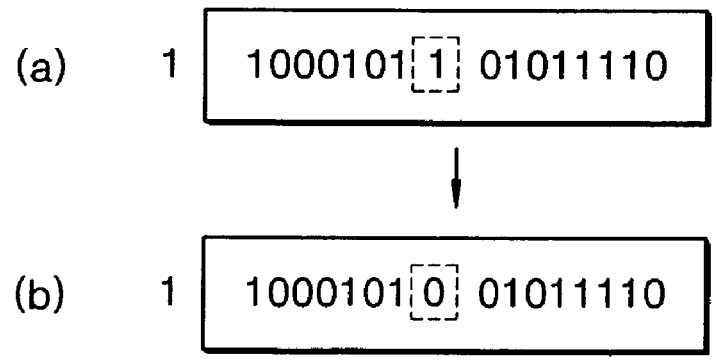
FIG. 8 illustrates an example of changing a portion of the data of a selected error diffusion coefficient.

After step 20, some error diffusion coefficients are selected from among the N groups of error diffusion coefficients that have portions of data that were switched in step 20, and portions of the selected error diffusion coefficients are changed (step 22). FIG. 8 illustrates an example in which a part of the data of an error diffusion coefficient is changed. Specifically, FIG. 8 shows a "1" changed into a "0". In alternative embodiments, two or more bits of binary data can be changed, and binary data of error diffusion coefficients belonging to two or more groups can be changed.

After step 22, the N groups of changed error diffusion coefficients are regarded as new error diffusion coefficients, and the process goes to step 12 (step 24). The error diffusion coefficients that have switched and changed data from previous processes are determined as the new error diffusion coefficients of the N groups. The new error diffusion coefficients are used to binarize the image having a gray level value in step 12.

The N groups of error diffusion coefficients determined through the above reproducing, switching, and changing processes result in higher fit values, by repeating the processes. Thus, the new error diffusion coefficients are determined to be ideal error diffusion coefficients.

Figure 9:
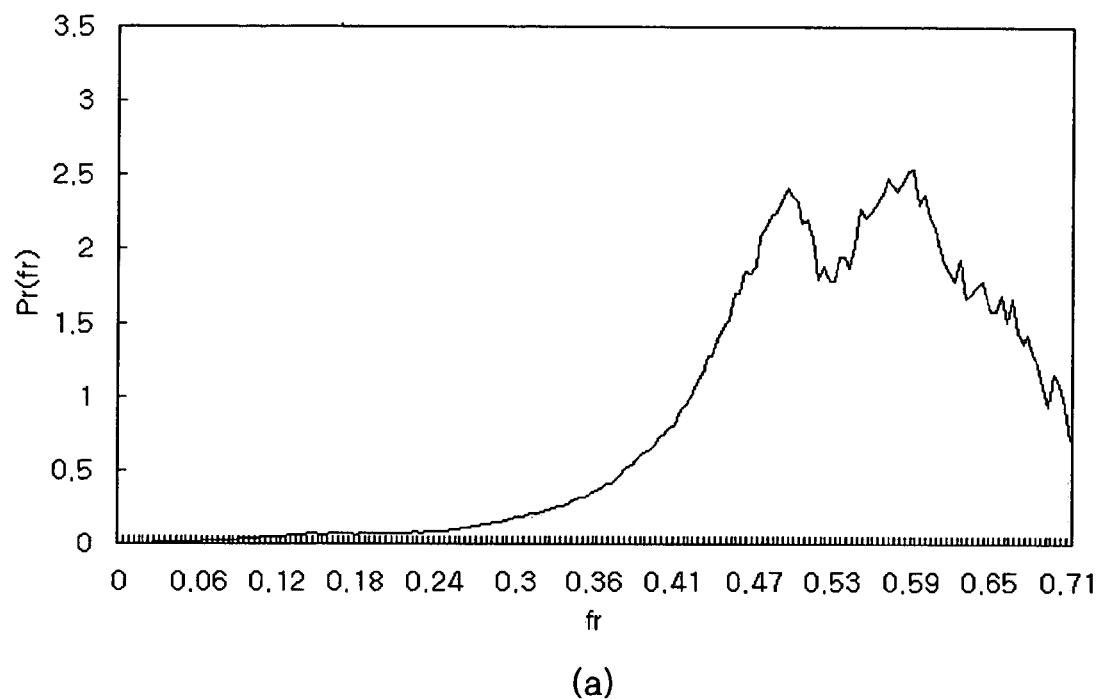
FIG. 9 illustrates energy spectra with respect to a binarized image having a gray level of 195.
Figure 9:
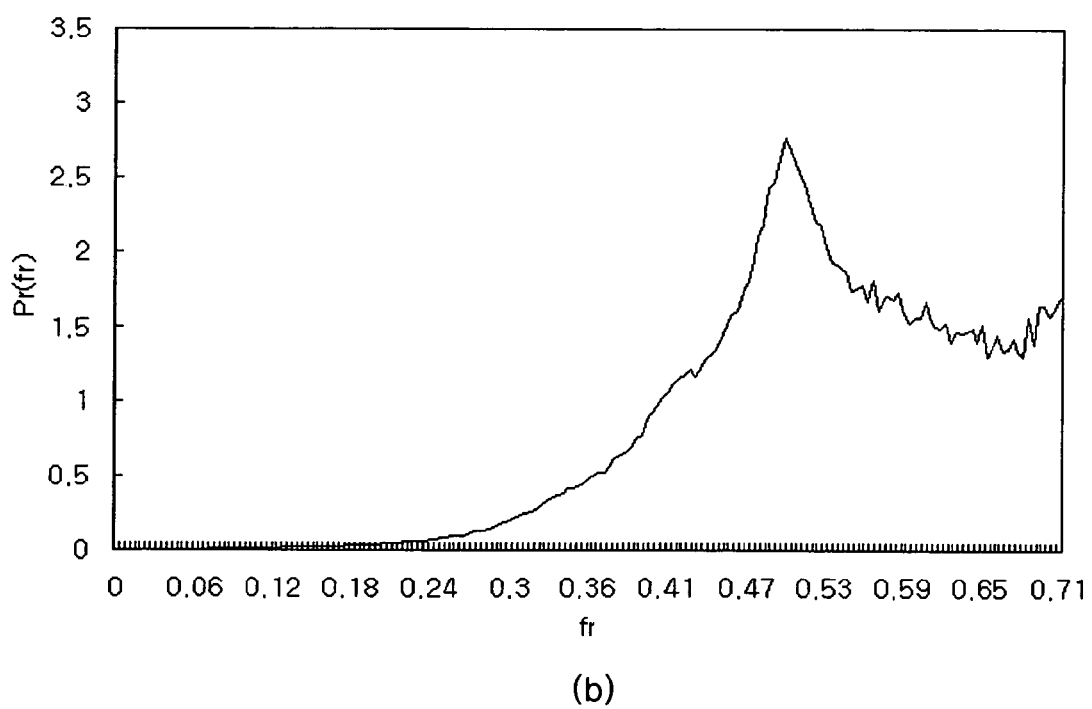
Figure 10:
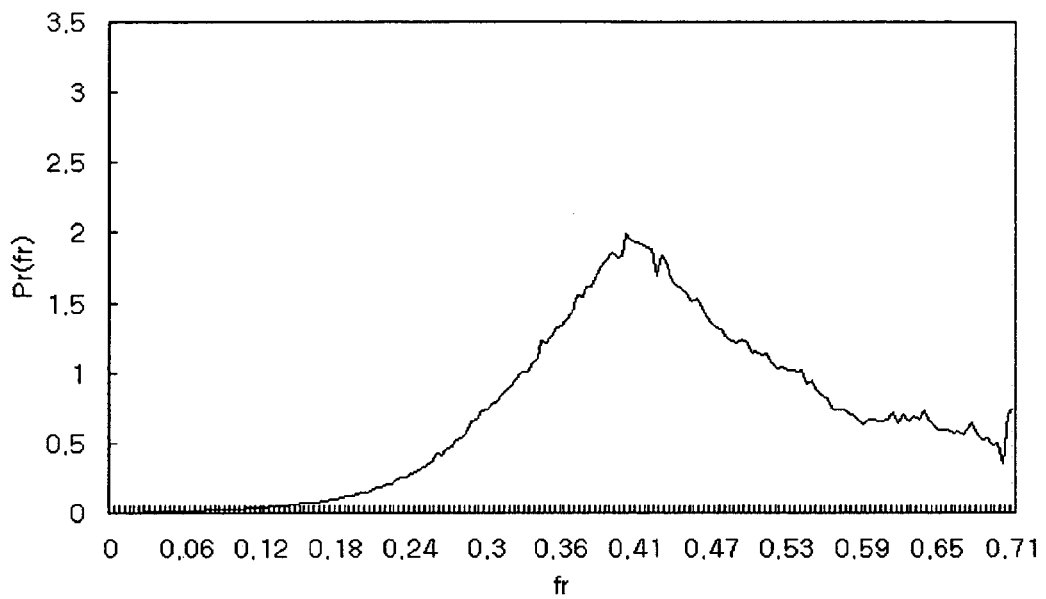
FIG. 10 illustrates energy spectra with respect to a binarized image having a gray level of 225.
Figure 10:
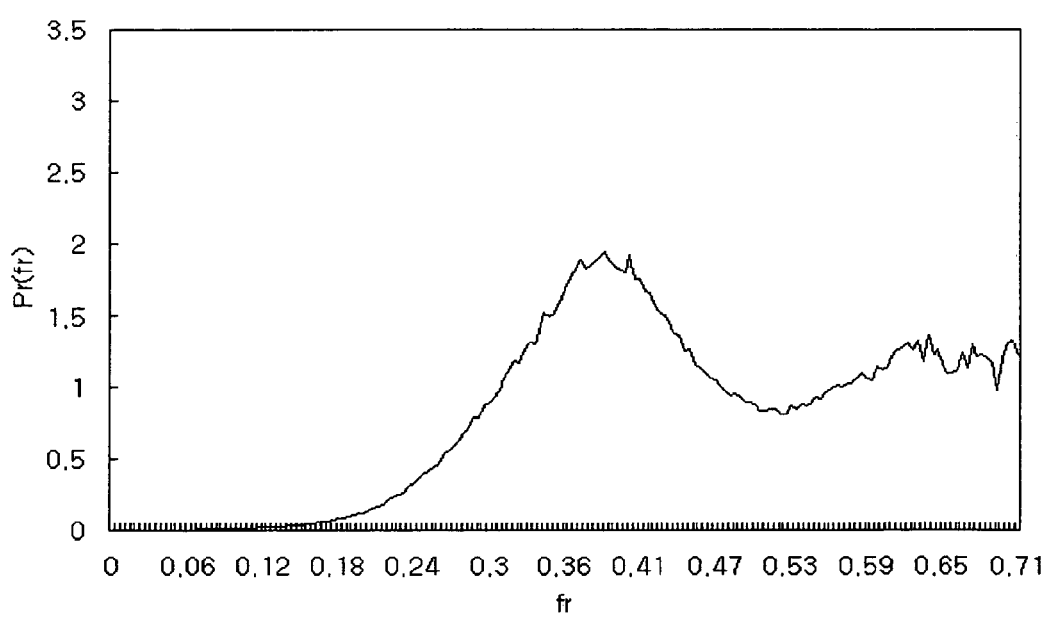
Figure 11:
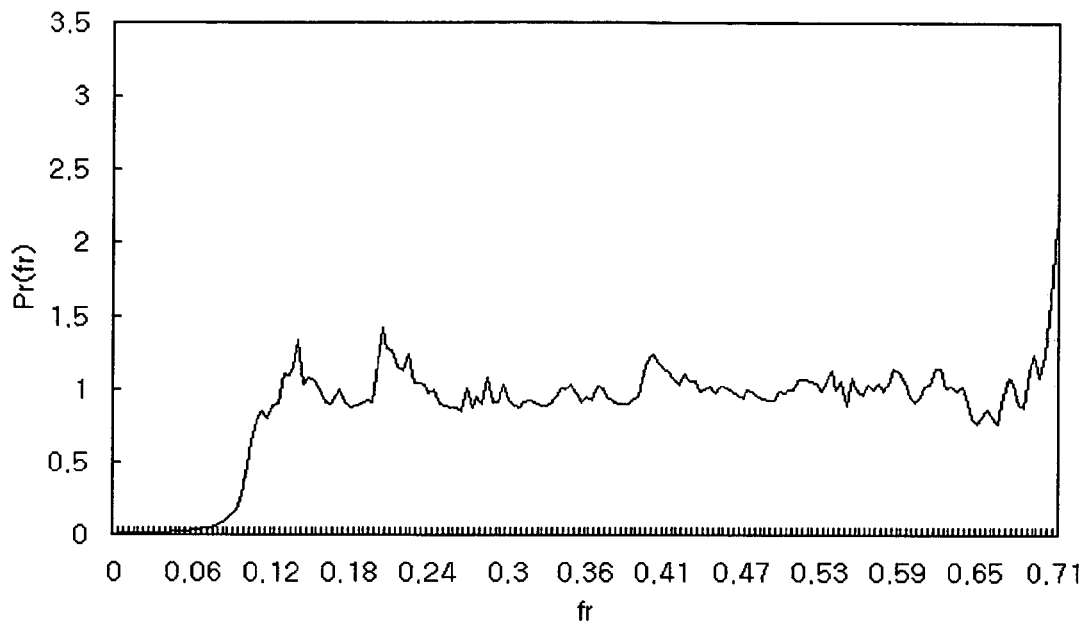
FIG. 11 illustrates energy spectra with respect to a binarized image having a gray level of 250.
Figure 11:
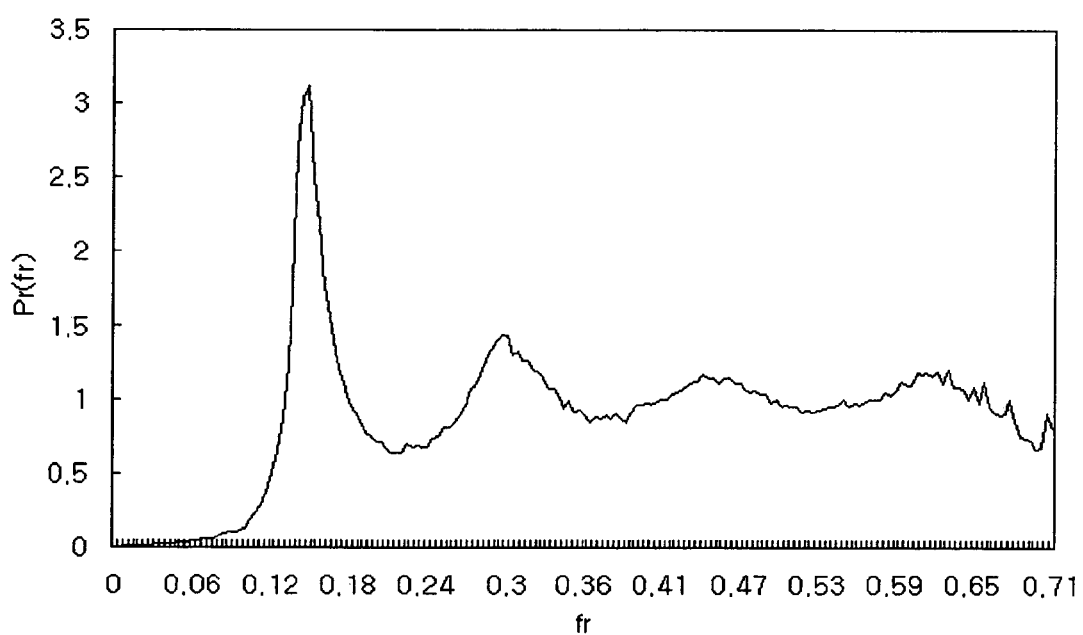

FIG. 9 illustrates energy spectra for a binary-coded image having a gray level value of 195, FIG. 10 illustrates energy spectra of a binary-coded image having a gray level value of 225, and FIG. 11 illustrates energy spectra of a binary-coded image having gray level value 250. More specifically, FIGS. 9(a), 10(a), and 11(a) illustrate optimal energy spectrums, and FIGS. 9(b), 10(b), and 11(b) illustrate comparison energy spectrums. As can be seen, the comparison energy spectrums of images that are binary-coded using error diffusion coefficients determined through hundreds of repeated processes according to an embodiment of the present invention are similar to their respective optimal energy spectrums. When the comparison energy spectrum is similar to the optimal energy spectrum, the quality of the image is good.

Hereinafter, an apparatus for determining error diffusion coefficients according to an embodiment of the present invention will be described with reference to the accompanying drawings.

Figure 12:
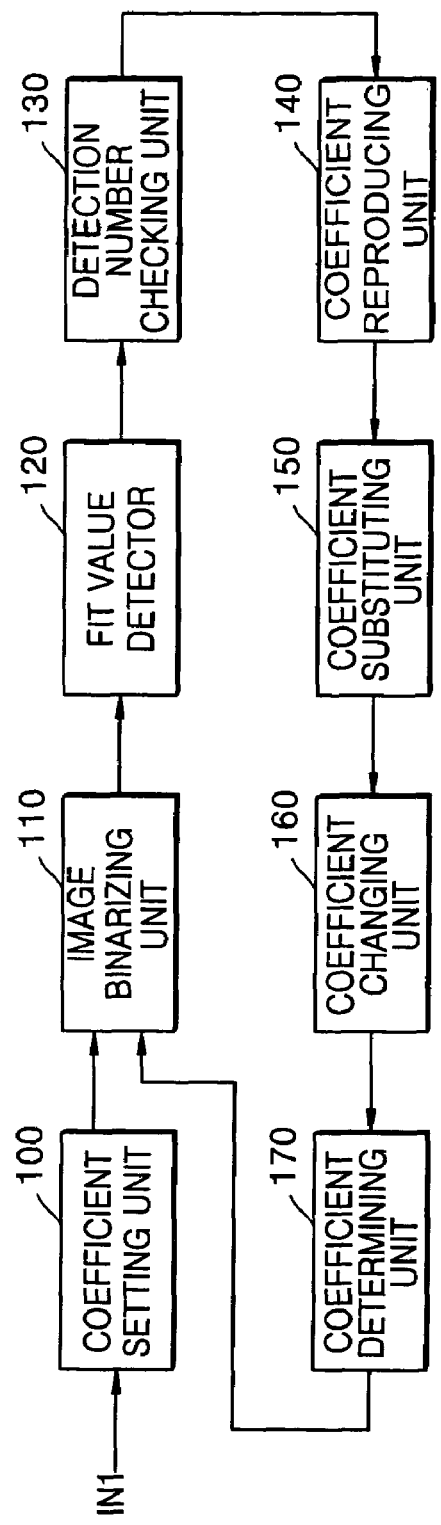
FIG. 12 is a block diagram illustrating an apparatus for determining error diffusion coefficients according to an embodiment of the present invention.

FIG. 12 is a block diagram illustrating an apparatus for determining error diffusion coefficients according to an embodiment of the present invention. The apparatus includes a coefficient setting unit 100, an image binarizing unit 110, a fit value detector 120, a detection number checking unit 130, a coefficient reproducing unit 140, a coefficient substituting unit 150, a coefficient changing unit 160, and a coefficient determining unit 170.

The coefficient setting unit 100 sets N groups of error diffusion coefficients. The coefficient setting unit 100 sets the error diffusion coefficients in response to a signal requesting a coefficient setting operation, input through an input terminal IN1, and outputs the set results to the image binarizing unit 110.

Figure 13:
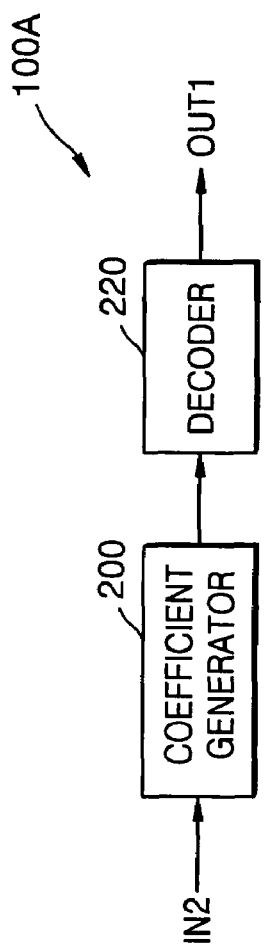
FIG. 13 is a block diagram illustrating a coefficient setting unit of the apparatus shown in FIG. 12.

FIG. 13 is a block diagram illustrating an example 100A of the coefficient setting unit 100 shown in FIG. 12. The coefficient setting unit 100A includes a coefficient generator 200 and a decoder 220.

The coefficient generator 200 generates the N groups of binary error diffusion coefficients in response to a signal requesting a coefficient setting operation, which is input through an input terminal IN2, and outputs the generated results to the decoder 220. FIG. 4 shows an example of the N groups of error diffusion coefficients generated by the coefficient generator 200.

The decoder 220 decodes the N groups of binary error diffusion coefficients into N groups of decimal error diffusion coefficients. The decoder 220 receives the N groups of error diffusion coefficients generated by the coefficient generator 200, decodes them into decimal error diffusion coefficients, and outputs the decoded results through an output terminal OUT1. FIG. 5 shows an example of the N groups of error diffusion coefficients decoded by the decoder 220.

The image binarizing unit 110 binarizes an image having a single gray level value using each of the error diffusion coefficients. The image binarizing unit 110 receives the N groups of error diffusion coefficients, which are set in the coefficient setting unit 100, binarizes the image having one gray level value using the input error diffusion coefficients, and outputs the binary-coded images to the fit value detector 120. Also, the image binarizing unit 110 receives the N groups of error diffusion coefficients, which are newly determined by the coefficient determining unit 170, binarizes the image having one gray level value using the new error diffusion coefficients, and outputs the binary-coded images to the fit value detector 120.

The fit value detector 120 determines N fit values using the evaluation function for each of the N binary-coded images input from the image binarizing unit 110, and outputs the results of the determinations to the detection number checking unit 130. Here, information output to the detection number checking unit 130 includes the detection number of the N fit values.

The fit value detector 120 detects the fit values of the N binary-coded images by adding the evaluation function in a low frequency region and the evaluation function in a high frequency region, using the relation between the optimal energy spectrum having a blue noise characteristic and the comparison energy spectrum that is compared to the optimal energy spectrum as the evaluation function. The fit value detector 120 preferably uses Equation 3 as the evaluation function, and detects the fit values for the binary-coded images using Equation 4.

The detection number checking unit 130 checks whether the N fit values are detected a predetermined number of times. For example, if the predetermined number is 200, the detection number checking unit 130 checks whether the fit values are detected 200 times. The detection number checking unit 130 receives the information about the detection number of the N fit values, which are detected by the fit value detector 120, checks whether the fit values are detected a predetermined number of times, and outputs the check results to the coefficient reproducing unit 140.

The coefficient reproducing unit 140 reproduces the error diffusion coefficients according to the reproduction rates determined by the detected N fit values. The coefficient reproducing unit 140 preferably determines the reproduction rates of the error diffusion coefficients using Equation 5. The coefficient reproducing unit 140 receives the check result that the number of detected fit values does not coincide with the predetermined number from the detection number checking unit 130, reproduces the N groups of error diffusion coefficients according to the reproduction rates determined by the detected N fit values, and outputs the result to the coefficient substituting unit 150.

The coefficient substituting unit 150 selects optional error diffusion coefficients in the reproduced N groups of error diffusion coefficients, and substitutes some portions of the binary data of selected error diffusion coefficients with each other, and outputs the results to the coefficient changing unit 160. FIG. 7 illustrates an example of substituting portions of the data of error diffusion coefficients in two groups.

The coefficient changing unit 160 selects error diffusion coefficients in the N groups of error diffusion coefficients, some of which contain substituted data, and changes portions of the data of the selected error diffusion coefficients. The coefficient changing unit 160 receives the N groups of error diffusion coefficients including coefficients with portions of data that has been substituted, from the coefficient substituting unit 150, and selects error diffusion coefficients among the received N groups. The coefficient changing unit 160 then changes parts of the binary data in the selected error diffusion coefficients. FIG. 8 illustrates an example of some data in a selected error diffusion coefficient being changed by the coefficient changing unit 160.

The coefficient determining unit 170 determines the N groups of error diffusion coefficients including the changed error diffusion coefficients as new error diffusion coefficients, and outputs the result to the image binarizing unit 110. The coefficient determining unit 170 receives the N groups of error diffusion coefficients including the error diffusion coefficients that are changed by the coefficient changing unit 160, and determines the changed error diffusion coefficients as new error diffusion coefficients. The coefficient determining unit 170 outputs the new error diffusion coefficients to the image binarizing unit 110 to binarize the image having one gray level value using the newly determined error diffusion coefficients.

As described above, according to an exemplary apparatus and method of determining error diffusion coefficients of the present invention, error diffusion coefficients are determined using a propagation algorithm, and desired error diffusion coefficients with respect to any input gray level can be determined without resorting to trial and error. In addition, the evaluation function considering the blue noise characteristic is used to prevent generation of a pattern that is visually unpleasant and to obtain an even distribution of the pattern.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of determining error diffusion coefficients, which is used in a printer that binarizes and prints an image, the method comprising:
    (a) setting a positive integer N groups of error diffusion coefficients, in which each group includes a plurality of coefficients;
    (b) binarizing an image having one gray level value using each of the N groups of error diffusion coefficients;
    (c) detecting N fit values with respect to N binary-coded images using an evaluation function;
    (d) determining whether the fit values are detected a predetermined number of times;
    (e) when a detection number of the fit values does not coincide with the predetermined number of times, reproducing the N groups of error diffusion coefficients according to reproduction rates determined by the N fit values;
    (f) selecting optional error diffusion coefficients in the reproduced N groups of error diffusion coefficients, and substituting portions of data of selected error diffusion coefficients with each other; and
    (g) determining the N groups of error diffusion coefficients including the error diffusion coefficients containing substituted data as new error diffusion coefficients, and returning to step (b).

2. The method of claim 1, wherein step (a) comprises:
generating N groups of binary error diffusion coefficients;
decoding the generated N groups of binary error diffusion coefficients into N groups of decimal error diffusion coefficients.

3. The method of claim 1, further comprising:
selecting error diffusion coefficients among the N groups of coefficients including the error diffusion coefficients containing substituted data, and changing portions of the data of the selected error diffusion coefficients.

4. A method of determining error diffusion coefficients, which is used in a printer that binarizes and prints an image, the method comprising:
    (a) setting a positive integer N groups of error diffusion coefficients, in which each group includes a plurality of coefficients:
    (b) binarizing an image having one gray level value using each of the N groups of error diffusion coefficients;
    (c) detecting N fit values with respect to N binary-coded images using an evaluation function;
    (d) determining whether the fit values are detected a predetermined number of times;
    (e) when a detection number of the fit values does not coincide with the predetermined number of times. reproducing the N groups of error diffusion coefficients according to reproduction rates determined by the N fit values;
    (f) selecting optional error diffusion coefficients in the reproduced N groups of error diffusion coefficients, and substituting portions of data of selected error diffusion coefficients with each other; and
    (g) determining the N groups of error diffusion coefficients including the error diffusion coefficients containing substituted data as new error diffusion coefficients, and returning to step (b);
    wherein step (c) uses a correlation coefficient between an optimal energy spectrum having an ideal blue noise characteristic and a comparison energy spectrum of each of the N binary-coded images, as the evaluation function.

5. The method of claim 4, wherein step (c) uses the following equation as the evaluation function:

$$R = \frac{\sum_m (A_m - \overline{A})(B_m - \overline{B})}{\sqrt{\left(\sum_m (A_m - \overline{A})^2\right)\left(\sum_m (B_m - \overline{B})^2\right)}},$$

wherein R represents the evaluation function, $\overline{A}$ represents an average energy in the optimal energy spectrum, $A_m$ represents energy at each frequency in the optimal energy spectrum, $\overline{B}$ represents an average energy in the comparison energy spectrum, and $B_m$ represents energy at each frequency in the comparison energy spectrum.

6. The method of claim 5, wherein in step (c), the fit values of the binary-coded N images are detected by adding the evaluation function in a low frequency region and the evaluation function in a high frequency region.

7. An apparatus for determining error diffusion coefficients, which is used in a printer that binarizes and prints an image, the apparatus comprising:
    a coefficient setting unit that sets a positive integer N groups of error diffusion coefficients, each group including a plurality of coefficients;

an image binarizing unit that binarizes an image having one gray level value using each of the N groups of error diffusion coefficients;

a fit value detector that detects N fit values with respect to each of the N binary-coded images using an evaluation function;

a detection number checking unit that checks whether the fit values are detected for a predetermined number of times;

a coefficient reproducing unit that reproduces the N groups of error diffusion coefficients according to reproduction rates determined by the detected N fit values;

a coefficient substituting unit that selects optional error diffusion coefficients in the reproduced N groups of error diffusion coefficients, and substitutes portions of data of selected error diffusion coefficients; and a coefficient determining unit that determines the N groups of error diffusion coefficients including the substituted error diffusion coefficients as new error diffusion coefficients, and outputs the result of the determination to the image binarizing unit.

8. The apparatus of claim 7, wherein the coefficient setting unit comprises:

a coefficient generator that generates the N groups of binary error diffusion coefficients; and a decoder that decodes the generated N groups of binary error diffusion coefficients into N groups of decimal error diffusion coefficients.

9. The apparatus of claim 7, further comprising:

a coefficient changing unit that selects error diffusion coefficients among the N groups of coefficients including the error diffusion coefficients containing substituted data, and changes portions of the data of the selected error diffusion coefficients.

10. An apparatus for determining error diffusion coefficients, which is used in a printer that binarizes and prints an image, the apparatus comprising:

a coefficient setting unit that sets a positive integer N groups of error diffusion coefficients, each group including a plurality of coefficients;

an image binarizing unit that binarizes an image having one gray level value using each of the N groups of error diffusion coefficients;

a fit value detector that detects N fit values with respect to each of the N binary-coded images using an evaluation function;

a detection number checking unit that checks whether the fit values are detected for a predetermined number of times;

a coefficient reproducing unit that reproduces the N groups of error diffusion coefficients according to reproduction rates determined by the detected N fit values;

a coefficient substituting unit that selects optional error diffusion coefficients in the reproduced N groups of error diffusion coefficients, and substitutes portions of data of selected error diffusion coefficients; and a coefficient determining unit that determines the N groups of error diffusion coefficients including the substituted error diffusion coefficients as new error diffusion coefficients, and outputs the result of the determination to the image binarizing unit;

wherein the fit value detector detects the fit values of the N binary-coded images by adding the evaluation function in a low frequency region and the evaluation function in a high frequency region using a correlation coefficient between an optimal energy spectrum having ideal blue noise characteristics and a comparison energy spectrum of each of the N binary-coded images, as the evaluation function.

11. The apparatus of claim 10, wherein the fit value detector uses the following equation as the evaluation function:

$$R = \frac{\sum_m (A_m - \overline{A})(B_m - \overline{B})}{\sqrt{\left(\sum_m (A_m - \overline{A})^2\right)\left(\sum_m (B_m - \overline{B})^2\right)}},$$

wherein, R represents the evaluation function, $\overline{A}$ represents an average energy in the optimal energy spectrum, $A_m$ represents energy at each frequency in the optimal energy spectrum, $\overline{B}$ represents an average energy in the comparison energy spectrum, and $B_m$ represents energy at each frequency in the comparison energy spectrum.

* * * * *